(12) United States Patent
Miyata et al.

(10) Patent No.: US 11,233,292 B2
(45) Date of Patent: Jan. 25, 2022

(54) CYLINDRICAL SEALED BATTERY AND BATTERY PACK

(71) Applicant: SANYO Electric Co., Ltd., Daito (JP)

(72) Inventors: Kyosuke Miyata, Osaka (JP); Kazutoshi Kohira, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 123 days.

(21) Appl. No.: 15/127,587

(22) PCT Filed: Mar. 18, 2015

(86) PCT No.: PCT/JP2015/001507
§ 371 (c)(1),
(2) Date: Sep. 20, 2016

(87) PCT Pub. No.: WO2015/146078
PCT Pub. Date: Oct. 1, 2015

(65) Prior Publication Data
US 2017/0133645 A1 May 11, 2017

(30) Foreign Application Priority Data
Mar. 28, 2014 (JP) .............................. JP2014-068770

(51) Int. Cl.
*H01M 50/148* (2021.01)
*H01M 50/342* (2021.01)
(Continued)

(52) U.S. Cl.
CPC ....... *H01M 50/3425* (2021.01); *H01M 4/525* (2013.01); *H01M 10/052* (2013.01);
(Continued)

(58) Field of Classification Search
CPC .................................................. H01M 2/014
See application file for complete search history.

(56) References Cited

U.S. PATENT DOCUMENTS 6,620,544 B1 9/2003 Shin et al.
6,649,301 B1 * 11/2003 Oh ...................... H01M 2/0413
429/56
(Continued)

FOREIGN PATENT DOCUMENTS

CN 101847759 A 9/2010
JP 2001-135301 A 5/2001
(Continued)

OTHER PUBLICATIONS

International Search Report dated Jun. 16, 2015, issued in counterpart International Application No. PCT/JP2015/001507 (2 pages).
(Continued)

*Primary Examiner* — Alix E Eggerding
(74) *Attorney, Agent, or Firm* — Westerman, Hattori, Daniels & Adrian, LLP (57) ABSTRACT

A nonaqueous electrolyte secondary battery representing an embodiment of a sealed battery of the present invention includes a bottomed cylindrical exterior case, a sealing member, a cylindrical wound electrode assembly and an electrolyte. An open end of the exterior case is crimped together with the sealing member via an insulating gasket so as to form a seal. The sealing member includes a lid having a thin and fragile portion, an insulating ring, and a terminal plate having a thin and fragile portion. The terminal plate is electrically connected to a positive electrode current collector leading out from the cylindrical wound electrode assembly. The lid and the terminal plate are electrically connected within an opening of the insulating ring. The lid is disposed so as to expose an outer side of at least a portion of the lid opposed to the opening of the insulating ring directly to an outside environment.

9 Claims, 3 Drawing Sheets (51) Int. Cl.
*H01M 10/052* (2010.01)
*H01M 50/30* (2021.01)
*H01M 50/107* (2021.01)
*H01M 50/116* (2021.01)
*H01M 50/155* (2021.01)
*H01M 50/166* (2021.01)
*H01M 50/171* (2021.01)
*H01M 50/528* (2021.01)
*H01M 50/543* (2021.01)
*H01M 50/167* (2021.01)
*H01M 4/525* (2010.01)
*H01M 10/0525* (2010.01)
*H01M 10/0587* (2010.01)

(52) U.S. Cl.
CPC ... *H01M 10/0525* (2013.01); *H01M 10/0587* (2013.01); *H01M 50/107* (2021.01); *H01M 50/116* (2021.01); *H01M 50/155* (2021.01); *H01M 50/166* (2021.01); *H01M 50/167* (2021.01); *H01M 50/171* (2021.01); *H01M 50/30* (2021.01); *H01M 50/528* (2021.01); *H01M 50/543* (2021.01); *H01M 2200/00* (2013.01); *Y02T 10/70* (2013.01)

(56) References Cited

U.S. PATENT DOCUMENTS

| | | | |
|---|---|---|---|
| 2007/0212595 A1* | 9/2007 | Kim | H01M 2/0413 429/53 |
| 2009/0148767 A1 | 6/2009 | Yamashita et al. | |
| 2010/0136387 A1* | 6/2010 | Kohn | H01M 2/027 429/56 |
| 2010/0136421 A1* | 6/2010 | Hermann | H01M 2/0202 429/178 |
| 2010/0247984 A1 | 9/2010 | Yamashita et al. | |
| 2011/0052948 A1* | 3/2011 | Pei | H01M 50/166 429/56 |
| 2011/0200856 A1* | 8/2011 | Yasui | H01M 2/1016 429/88 |
| 2014/0038005 A1* | 2/2014 | Yamato | H01M 2/1235 429/57 |
| 2014/0178732 A1* | 6/2014 | Mizawa | H01M 4/13 429/94 |
| 2015/0004446 A1* | 1/2015 | Kim | H01M 2/0456 429/56 |
| 2015/0072179 A1 | 3/2015 | Itabashi | |
| 2015/0364735 A1* | 12/2015 | Kohira | H01M 50/3425 429/55 |
| 2016/0343997 A1* | 11/2016 | Sekiya | H01G 11/74 |

FOREIGN PATENT DOCUMENTS

| | | |
|---|---|---|
| JP | 2007-157609 A | 6/2007 |
| JP | 2009-140870 A | 6/2009 |
| JP | 2009-245650 A | 10/2009 |
| JP | 2013-62113 A | 4/2013 |
| JP | WO2013/111318 A1 | 8/2013 |

OTHER PUBLICATIONS

English Translation of Search Report dated Jul. 26, 2018, issued in counterpart Chinese Patent Application No. 201580009776.2. (2 pages).

* cited by examiner

Figure 1

COMPARATIVE EXAMPLE

CYLINDRICAL SEALED BATTERY AND BATTERY PACK

TECHNICAL FIELD

The present invention relates to cylindrical sealed batteries having a safety valve in the seal through which a gas can be effectively discharged in the event of pressure increase in the battery, and to battery packs including the cylindrical sealed battery.

BACKGROUND ART

Nonaqueous electrolyte secondary batteries represented by lithium ion secondary batteries have a high energy density and a high capacity and are widely used as driving power sources of portable information terminals such as cellphones and notebook computers. Recently, nonaqueous electrolyte secondary batteries are increasingly demanded to be used in high-voltage and high-capacity applications such as driving power sources of battery-driven automobiles and household electricity storage systems. This trend has led to a need of such characteristics as high-output characteristics, long-term durability and safety.

Because of the use of combustible organic solvents, nonaqueous electrolyte secondary batteries are usually manufactured as sealed batteries. Sealed batteries have a risk of rupture by the rapid generation of gas in the event of abnormalities such as internal short circuits, external short circuits, abnormal heating and abnormal impacts. As disclosed in, for example, Patent Literature 1, a known approach to solving this problem is to provide a safety valve in the seal of a cylindrical sealed battery and thereby to discharge a gas in the battery to the outside of the battery through the seal when the pressure inside the battery has reached a prescribed value.

CITATION LIST

Patent Literature

PTL 1: Japanese Published Unexamined Patent Application No. 2009-140870

SUMMARY OF INVENTION

Technical Problem

With the recent increase in the energy density of batteries, there is a risk that the battery temperature and the battery inner pressure will be increased more sharply in the event of an abnormality in the battery. As described in Patent Literature 1, a conventional cylindrical sealed battery includes a perforated cap that is disposed above the outer side of a safety valve to serve as a region for an electrical connection with other battery or a load. A gas generated inside the battery in the event of an abnormality in the battery opens the safety valve and is discharged to the outside through the opening in the cap.

Although the area of the opening in the cap is preferably as large as possible, extending the area of the opening encounters a limitation caused by the need of a region for establishing an electrical connection with other battery or a load. Consequently, cylindrical sealed batteries sometimes fail to discharge the gas sufficiently in spite of having the safety valve in the seal.

Prismatic sealed batteries do not have such a problem because the safety valve is usually exposed to the outside. Thus, there has been a demand that a gas generated inside a cylindrical sealed battery in the event of an abnormality in the battery be discharged to the outside more sufficiently than heretofore possible.

Solution to Problem

An aspect of the present invention resides in a cylindrical sealed battery including:

a bottomed cylindrical exterior case, a sealing member, a cylindrical wound electrode assembly including a positive electrode plate and a negative electrode plate wound together via a separator, and an electrolyte, the cylindrical wound electrode assembly and the electrolyte being accommodated in the exterior case, an open end of the exterior case being crimped together with the sealing member via an insulating gasket so as to form a seal, the sealing member including a lid having a thin and fragile portion, an insulating ring disposed on an inner side of the lid, and a terminal plate having a thin and fragile portion disposed on the inner side of the lid, the terminal plate being electrically connected to a current collector leading out from the cylindrical wound electrode assembly, the lid and the terminal plate being electrically connected to each other within an opening of the insulating ring, the lid being disposed so as to expose an outer side of at least a portion of the lid opposed to the opening of the insulating ring directly to an outside environment.

Another aspect of the invention resides in a battery pack including:

the cylindrical sealed battery according to the above aspect, and a holder holding the cylindrical sealed battery, the holder having a lid deformation suppressing portion protruding toward an outer peripheral portion of the lid.

Advantageous Effects of Invention

In the cylindrical sealed battery according to one aspect of the invention, a gas generated inside the battery in the event of an abnormality in the battery is released to the outside directly through a hole formed by the breakage of the fragile portion of the lid. Thus, the gas can be discharged speedily before the battery undergoes a thermal runaway as compared to a conventional cylindrical sealed battery which is fitted with a cap having an opening as a gas release hole.

In addition, the lid can form a sufficiently large hole so that when the battery is combusted by, for example, external heating or the like and the melts of the battery constituents such as aluminum are discharged together with the gas through the lid, the melts such as aluminum can be immediately released to the outside and the hole formed in the lid is prevented from being clogged by the melts such as aluminum. Thus, the cylindrical sealed battery according to one aspect of the invention attains higher safety than conventional batteries.

In the battery pack according to another aspect of the invention, the holder that holds the cylindrical sealed battery has a lid deformation suppressing portion protruding toward an outer peripheral portion of the lid. The lid deformation suppressing portion serves as a fulcrum during the breakage of the fragile portion, of the terminal plate and the fragile portion of the lid. Thus, the battery pack according to this aspect of the invention attains an enhancement, in safety by virtue of the facilitated breakage of the fragile portion of the terminal plate and the fragile portion of the lid upon increase in the inner pressure of the battery.

DESCRIPTION OF EMBODIMENTS

Hereinbelow, embodiments of the invention will be described in detail with respect to cylindrical sealed batteries applied to nonaqueous electrolyte secondary batteries as an example. The embodiments presented below are only illustrative fox better understanding of the technical ideas of the invention, and do not intend to limit the scope of the invention to such embodiments. The present invention is applicable equally to various modifications that are made without departing from the technical ideas described in the claims.

Embodiment 1

A nonaqueous electrolyte secondary battery 10 as a cylindrical sealed battery of Embodiment 1 will be described with reference to FIG. 1. The nonaqueous electrolyte secondary battery 10 includes a cylindrical wound electrode assembly 14 in which a positive electrode plate 11 and a negative electrode plate 12 are spirally wound via a separator 13. An upper insulating plate 16 and a lower insulating plate 17 are respectively disposed on and below the cylindrical wound electrode assembly 14, and the cylindrical wound electrode assembly 14 is disposed in an exterior case 15 made of a metal.

A nonaqueous electrolytic solution (not shown) has been poured into the exterior case 15. The open end of the exterior case 15 is crimped together with a sealing member 20 via an insulating gasket 21 so as to form a seal. A positive electrode current collector 18 connected to the positive electrode plate 11 is welded to the lower surface of the sealing member 20, and a negative electrode current collector 19 connected to the negative electrode plate 12 is welded to the inner bottom of the exterior case 15. Thus, the exterior case 15 serves as a negative electrode external terminal and the sealing member 20 as a positive electrode external terminal.

The sidewall of the exterior case 15 has a grooved portion 15*a* protruding toward the central axis of the battery. An edge portion of the upper insulating plate 16 is held by the grooved portion 15*a* disposed on the sidewall of the exterior case 15 so that the plate serves as an upper stopper for the cylindrical wound electrode assembly 14. The insulating gasket 21 is disposed above the level of the grooved portion 15*a* and fixes the sealing member 20.

The sealing member 20 includes a lid 22 which has a fragile portion 22*a* with a smaller thickness than other regions, a circular insulating ring 23 which is disposed on the surface of the lid 22 facing the inside of the battery and has an opening 23*a*, and a terminal plate 24 which is disposed on the surface of the insulating ring 23 facing the inside of the battery.

The fragile portion 22*a* of the lid 22 is disposed on the outer side of a portion opposed to the opening 23*a* of the insulating ring 23. The lid 22 is thicker on the outer peripheral side to ensure a strength withstanding the fitting by crimping of the sealing member 20 to the open end of the exterior case 15. A portion of the lid 22 forms a thin step 22*b* that protrudes toward the opening in the insulating ring 23.

On the surface of the terminal plate 24 facing the inside of the battery, a fragile portion 24*a* is formed with a smaller thickness than other regions to reliably interrupt the current between the terminal plate 24 and the lid 22 in the event of a pressure increase inside the exterior case 15. A portion of the terminal plate 24 forms a thin step 24*b* that protrudes toward the opening in the insulating ring 23. While the fragile portion 24*a* of the terminal plate 24 is illustrated as being formed in the thin step 24*b*, this fragile portion may be formed in other thicker region.

The step 22*b* in the lid 22 and the step 24*b* in the terminal plate 24 are in plane contact with each other within the opening 23*a* of the insulating ring 23. Further, these two surfaces in contact together are laser welded and have at least one weld spot 25. Consequently, the lid 22 and the terminal plate 24 are electrically connected to each other within the opening 23*a* of the insulating ring 23.

According to the sealing member 20 configured as described above, the fragile portion 22*a* of the lid 22 is broken when the pressure inside the exterior case 15 exceeds a prescribed value, resulting in the formation of a large hole in the lid 22. Thus, the battery can sufficiently manage gas evacuation even if a gas is generated rapidly inside the battery. Consequently, the battery can eliminate a risk that the sidewall of the exterior case 15 will be damaged by the inner pressure after the hole has been formed in the lid 22, thereby suppressing the occurrence of cracks in the sidewall of the exterior case 15. With this configuration, the gas and the electrolytic solution that are being discharged from the inside of the exterior case 15 in the event of an abnormality in the battery can be guided exclusively toward the sealing member 20.

With the configuration described above, the nonaqueous electrolyte secondary battery 10 as a cylindrical sealed battery of Embodiment 1 prevents adverse effects on components adjacent to the sidewall of the exterior case 15. When, for example, the nonaqueous electrolyte secondary batteries 10 as cylindrical sealed batteries are used in an assembled battery, the occurrence of an abnormality in a single battery does not impair the safety of the other batteries constituting the assembled battery.

The positive electrode current collector 18 connected to the positive electrode plate 11 is welded to the inner surface of the thick portion of the terminal plate 24 that is closer to the outer peripheral side than the step 24*b* and the fragile portion 24*a*. With this configuration, the positive electrode current collector 18 connected to the positive electrode plate 11 does not affect the operation of the terminal plate 24 as the safety valve.

The fragile portion 22*a* of the lid 22 and the fragile portion 24*a* of the terminal plate 24 are both disposed closer to the inner peripheral side than the projection formed by the grooved portion 15*a*. The reason for adopting this configuration is because otherwise the fragile portions 22*a* and 24*a* are subjected to a load and may be cracked when the exterior case 15 is crimped together with the sealing member 20 having the lid 22 and the terminal plate 24.

Preferably, a center pin 26 is inserted to the center of the cylindrical wound electrode assembly 14. This center pin 26 provides a gas flow channel in the center of the cylindrical wound electrode assembly 14, and can guide a gas toward the sealing member 20 speedily even if the cylindrical wound electrode assembly 14 has been swollen by the gas generated inside the battery due to any abnormality in the battery.

According to the nonaqueous electrolyte secondary battery 10 of Embodiment 1 having the configuration described above, a gas generated inside the battery due to any abnormality in the battery is released to the outside directly through a sufficiently large hole formed in the lid 22, and consequently the gas can be discharged quickly as compared to a conventional cylindrical sealed battery which is fitted with a cap having an opening as a gas release hole.

In the event that the nonaqueous electrolyte secondary battery 10 of Embodiment 1 is combusted by external heating or the like and the melts of the battery constituents such as aluminum are discharged together with the gas through the hole formed in the lid 22, the melts such as aluminum can be immediately released to the outside while the hole formed in the lid 22 is prevented from being clogged. Thus, the nonaqueous electrolyte secondary battery 10 of Embodiment 1 attains enhanced safety as compared to conventional cylindrical sealed batteries.

In the above configuration, the lid 22 and the terminal plate 24 may include aluminum or an aluminum alloy. Aluminum or an aluminum alloy is lightweight, easy to deform and highly resistant to electrolytic solutions, and is therefore suited as the material of the lid 22 and the terminal plate 24. The thin portions of the lid 22 and the terminal plate 24, the fragile portion 22a of the lid 22, and the fragile portion 24a of the terminal plate 24 may be formed by any methods without limitation. Press working is preferable because of its simplicity.

In nonaqueous electrolyte secondary batteries, a positive electrode current collector connected to a positive electrode plate usually includes aluminum or an aluminum alloy in view of the fact that the core of the positive electrode plate is aluminum or an aluminum alloy. In the nonaqueous electrolyte secondary battery 10 of Embodiment 1, easy welding may be attained by adopting a lid 22 and a terminal plate 24 that include aluminum or an aluminum alloy similarly to the positive electrode current collector 18 of aluminum or an aluminum alloy connected to the positive electrode plate 11.

Figure 1:
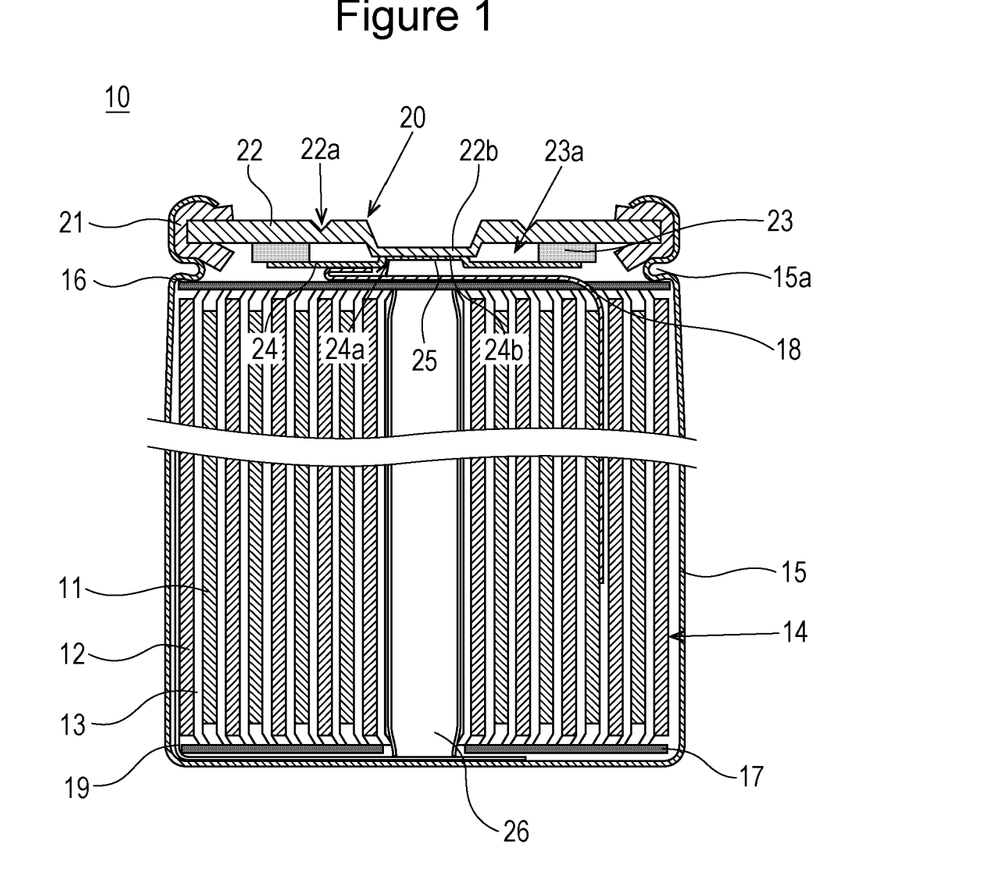
FIG. 1 is a sectional view of a nonaqueous electrolyte secondary battery representing a cylindrical sealed battery according to Embodiment 1.

Next, a method for manufacturing the nonaqueous electrolyte secondary battery 10 of Embodiment 1 will be specifically described with appropriate reference to FIG. 1.

[Fabrication of Positive Electrode Plate]

A positive electrode active material including lithium•nickel•cobalt•aluminum composite oxide ($LiNi_{0.8}Co_{0.15}Al_{0.05}O_2$), a conductive agent including acetylene black, and a binder including polyvinylidene fluoride (PVdF) were weighed in a mass ratio of 100:2.5:1.7 and were mixed together with an organic solvent including N-methyl-2-pyrrolidone to give a positive electrode mixture paste. The positive electrode mixture paste was applied to both sides of an aluminum foil (thickness: 15 μm) as a positive electrode core in a uniform thickness by a doctor blade method.

The coated foil was passed through a dryer to remove the organic solvent, was rolled with a roll press machine, and was thereafter cut. A positive electrode plate was thus fabricated which had the positive electrode mixture layer on both sides of the positive electrode core. Subsequently, a positive electrode current collector 18 made of aluminum was ultrasonically welded to a portion of the positive electrode core exposed from the positive electrode mixture layer. In this manner, a positive electrode plate 11 with a length of 573 mm, a width of 57 mm and a thickness of 163 μm was fabricated.

[Fabrication of Negative Electrode Plate]

A negative electrode active material including graphitizable carbon particles, a binder including polyvinylidene fluoride (PVdF), and a thickener including carboxymethyl cellulose were mixed together in a mass ratio of 100:0.6:1. The mixture was mixed with an appropriate amount of water to give a negative electrode mixture paste. The negative electrode mixture paste was applied to both sides of a copper foil (thickness: 10 μm) as a negative electrode core in a uniform thickness by a doctor blade method.

The coated foil was passed through a dryer to remove the water, was rolled with a roll press machine, and was hereafter cut. A negative electrode plate was thus fabricated which had the negative electrode mixture layer on both sides of the negative electrode core. Subsequently, a negative electrode current collector 19 made of nickel was ultrasonically welded to a portion of the negative, electrode core exposed from the negative electrode mixture, layer. In this manner, a negative electrode, plate 12 was fabricated.

[Fabrication of Cylindrical Wound Electrode Assembly]

The positive electrode plate 11 and the negative electrode plate 12 fabricated as described above were, wound with a winding machine while being insulated from each other via a separator 13 composed of a polyethylene microporous film. An insulatng tape was attached to the end of the coil. In this manner, a cylindrical wound electrode assembly 14 was fabricated.

[Preparation of Nonaqueous Electrolyte]

Ethylene carbonate (EC), dimethyl carbonate (DMC) and ethyl methyl carbonate (EMC) were mixed together in a volume ratio of 2:2:6 (at 1 atm and 25° C.). To this nonaqueous solvent, $LiPF_6$ as an electrolyte salt was dissolved with a concentration of 1.0 mol/L. A nonaqueous, electrolytic solution was thus prepared.

[Fabrication of Exterior Case]

A steel sheet as a base was plated with nickel and was thereafter drawn to form a bottomed cylindrical exterior case 15. Here, the exterior case 15 had a thickness of 0.2 mm at the open end to be sealed and a thickness of 0.2.5 mm at the sidewall. The bottom of the exterior case 15 had a thickness of 0.3 mm and was provided with a C-shaped groove. The thickness of the groove was 0.05 mm.

[Fabrication of Sealing Member]

A lid 22 was fabricated by pressing a 1.0 mm thick aluminum alloy plate. The outer diameter was 17 mm. A thin and fragile portion 22a with a diameter of 9 mm was formed in the center, and a thin step 22b was formed on the central side of the fragile portion. An insulating ring 23 was fabricated by injection molding of polypropylene and had a thickness of 0.8 mm, an outer diameter of 14 mm and an inner diameter of 10 mm. A terminal plate 24 was fabricated by processing a 0.5 mm thick aluminum alley. The outer diameter thereof was 13 mm. A thin step 24b was formed at the center, and a thinner and fragile portion 24a was formed on the central side of the step 24b. The lid 22, the insulating ring 23 and the terminal plate 24 were stacked together in such a manner that the step 22b in the lid 22 and the step 24b in the terminal plate 24 were in plane contact with each other. Central portions of these surfaces in contact together were joined by spot laser welding. A sealing member 20 was thus fabricated.

[Assembling of Battery]

An upper insulating plate 16 and a lower insulating plate 17 both made of polypropylene were placed on and below the cylindrical wound electrode assembly 14 fabricated as described hereinabove. The cylindrical wound electrode assembly 14 was then accommodated into the exterior case 15, and the negative electrode current collector 19 and the bottom of the exterior case 15 were resistance welded. Thereafter, the exterior case 15 was plastically deformed to form a circumferential grooved portion 15a having a width of 1.0 mm and a depth of 1.5 mm. The nonaqueous electrolytic solution prepared as described hereinabove was poured into the exterior case 15.

Thereafter, the lid 22 of the sealing member 20 and the positive electrode current collector 18 were laser welded to each other. Subsequently, the open end of the exterior case 15 was crimped together with the sealing member 20 fitted with an insulating gasket 21 to form a seal. In this manner, a nonaqueous electrolyte secondary battery 10 as a cylindrical sealed battery of Embodiment 1 was fabricated. The nonaqueous electrolyte secondary battery 10 had a height of 65 mm, a diameter of 18 mm, a designed capacity of 3200 mAh and a volume energy density of 500 Wh/L.

Comparative Example

Figure 2:
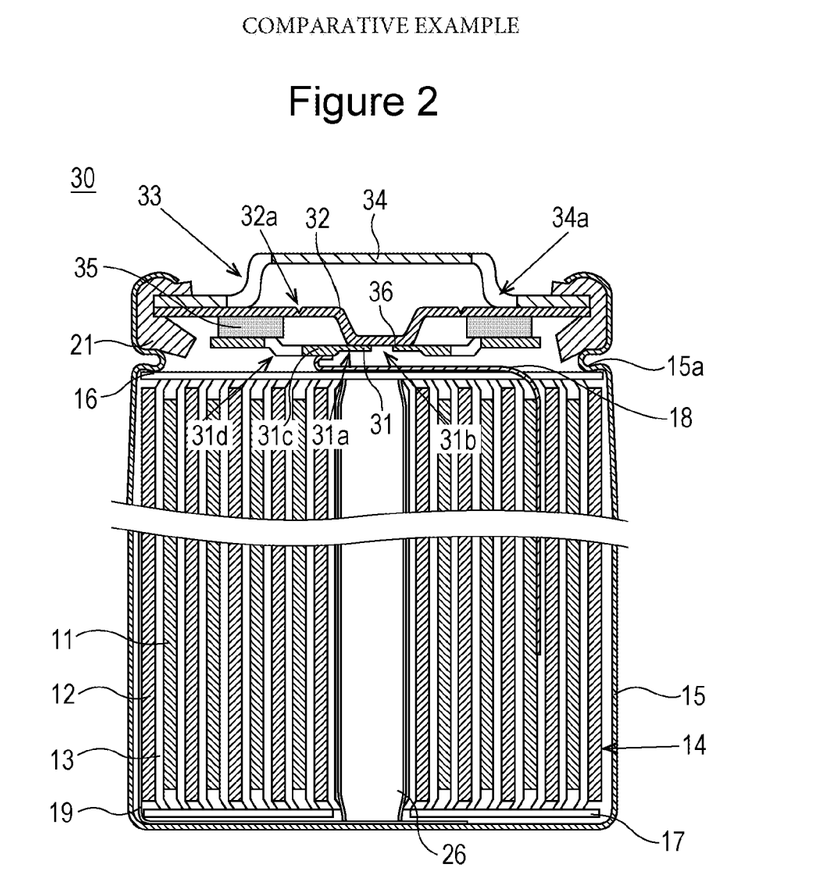
FIG. 2 is a sectional view of a nonaqueous electrolyte secondary battery representing a cylindrical sealed battery of Comparative Example.

FIG. 2 illustrates a nonaqueous electrolyte secondary battery 30 as a comparative cylindrical sealed battery representing a conventional example. The nonaqueous electrolyte secondary battery 30 has the same configuration as the nonaqueous electrolyte secondary battery 10 of Embodiment 1 except that a sealing member 33 has a conventional structure including a terminal plate 31, an explosion-proof valve 32 and a cap 34. Thus, the nonaqueous electrolyte secondary battery 30 of Comparative Example will be described in detail with respect only to the configuration of the sealing member 33, and the members common to the nonaqueous electrolyte secondary battery 10 of Embodiment 1 will be indicated with the same reference signs and the detailed description thereof will be omitted.

The sealing member 33 includes a cap 34 which has a gas release hole 34a, a terminal plate 31 and an explosion-proof valve 32 which have respective breakable grooves 31a and 32a to be broken upon increase in the inner pressure of the battery, and an insulating plate 35 which prevents conduction between outer peripheral portions of the terminal plate 31 and the explosion-proof valve 32. An opening 31b is disposed in a central portion of the terminal plate 31 that is closer to the inner peripheral side than the breakable groove 31a. A weld spot 36 is formed at the boundary between the opening 31b and the explosion-proof valve 32 as a result of laser welding. Thus, the terminal plate 31 and the explosion-proof valve 32 are electrically connected to each other. In the terminal plate 31, another opening 31d is disposed closer to the outer peripheral side than the breakable groove 31a.

The outer peripheral side of the terminal plate 31 has a larger thickness and serves as a terminal plate portion 31c that is electrically connected to a positive electrode plate 11. A positive electrode current collector 18 connected to the positive electrode plate 11 is ultrasonically welded to this terminal plate portion 31c to establish an electrical connection.

Upon increase in the inner pressure in this comparative nonaqueous electrolyte secondary battery 30, the terminal plate 31 and the explosion-proof valve 32 are deformed first and the weld spot 36 is disintegrated to cause a disconnection of the electrical contact between the terminal plate 31 and the explosion-proof valve 32, thus the conduction to the cap 34 being interrupted. With a further increase in the inner pressure in the battery, the breakable groove 32a disposed in the explosion-proof valve 32 is broken to form a hole, and the gas in the battery is discharged to the outside of the battery through the hole formed in the explosion-proof valve 32 and the gas release hole 34a.

This nonaqueous electrolyte secondary battery 30 illustrated as a cylindrical sealed battery of Comparative Example had a volume energy density of 500 Wh/L.

[Safety Test]

Twenty nonaqueous electrolyte secondary batteries 10 of Embodiment 1 and twenty nonaqueous electrolyte secondary batteries 30 of Comparative Example were provided. At room temperature (25° C.), the batteries were charged at a constant current of 0.5 It (1600 mA) to a voltage of 4.2 V. Thereafter, an overcharge test and a hot plate test were performed each with respect to ten of each group of batteries.

[Overcharge Test]

The overcharge test was performed by charging the batteries continuously at a constant current of 1.5 It (4800 mA). In the batteries of Embodiment 1, the charging was stopped by the breakage of the fragile portion 24a. In the batteries of Comparative Example, the charging was discontinued by the breakage of the breakable groove 31a. None of the batteries burst or caught fire.

[Hot Plate Test]

The hot plate test was performed by heating the batteries on a hot plate set at 200° C. During the test, the batteries were visually inspected for the condition of the sealing member or the detachment of the sealing member from the exterior case, and the occurrence of cracks in the sidewall of the exterior case.

According to the results of the hot plate test, none of the batteries burst during the testing. However, while the nonaqueous electrolyte secondary batteries 10 of Embodiment 1 allowed the gas to be discharged therefrom smoothly, the nonaqueous electrolyte secondary batteries 30 of Comparative Example suffered clogging of the gas release hole 34a of the cap 34 with residues of the combustion of the cylindrical wound electrode assembly 14. It has been thus shown that the nonaqueous electrolyte secondary batteries 10 as cylindrical sealed batteries of Embodiment 1 have higher safety than the nonaqueous electrolyte secondary batteries 30 of Comparative Example.

As demonstrated above, the nonaqueous electrolyte secondary battery 10 as a cylindrical sealed battery of Embodiment 1 is configured so that the fragile portion 22a of the lid 22 is broken promptly to form a large hole upon increase in the inner pressure in the battery. The nonaqueous electrolyte secondary battery 10 as a cylindrical sealed battery of Embodiment 1 has been confirmed to be capable of sufficiently managing gas evacuation even if a gas is generated rapidly inside the battery by virtue of the lid 22 also serving as an explosion-proof valve, and has been therefore confirmed to eliminate a risk that the sidewall of the exterior case 15 will be damaged after the hole has been formed in the lid 22.

In contrast, the nonaqueous electrolyte secondary battery 30 as a comparative cylindrical sealed battery suffered clogging of the gas release hole 34a with residues of the combustion of the cylindrical wound electrode assembly probably because the gas release hole 34a serving as a gas evacuation route was smaller than the hole formed in the lid 22 of the nonaqueous electrolyte secondary battery 10 of Embodiment 1.

Thus, the nonaqueous electrolyte secondary batteries 30 of Comparative Example have a higher risk that the sidewall of the exterior case 15 will be damaged when the gas evacuation takes place at a high pressure as compared to the nonaqueous electrolyte secondary batteries of Embodiment 1. A crack in the sidewall of the exterior case 15 causes the gas or the electrolytic solution to leak through the crack, thus giving rise to a risk that components such as members and batteries present near the abnormal battery will be adversely affected.

The test results discussed above have shown that the nonaqueous electrolyte secondary batteries of Embodiment 1 of the present invention can provide cylindrical sealed batteries which include a sealing member fitted with a gas evacuation valve that attains enhanced safety as compared to conventional batteries.

Embodiment 2

Figure 3:
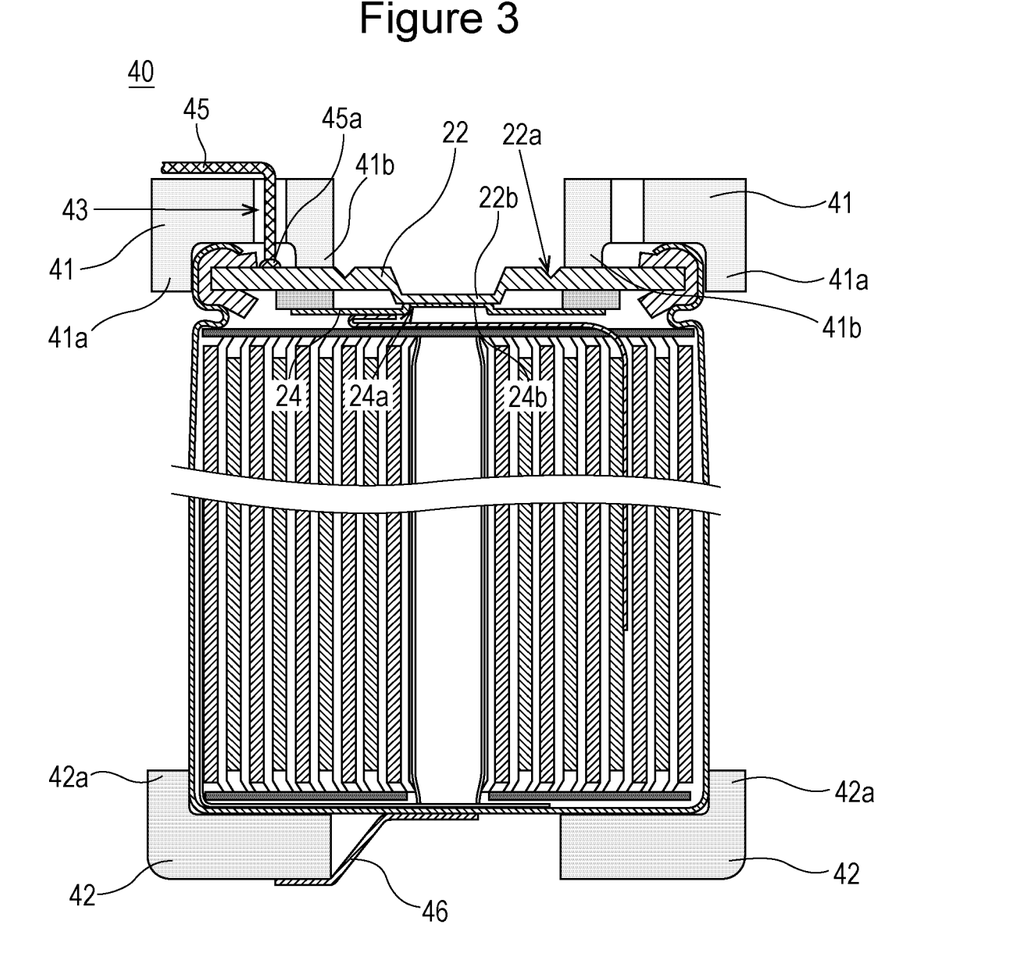
FIG. 3 is a sectional view of a battery pack according to Embodiment 2.

In Embodiment 2, a holder is attached to the nonaqueous electrolyte secondary battery 10 as a cylindrical sealed battery of Embodiment 1 to form a battery pack 40. In Embodiment 2, only the features of the nonaqueous electrolyte secondary battery 10 of Embodiment 1 that are necessary for the explanation will be described using the same reference signs as in Embodiment 1 and the detailed description of other features will be omitted.

The battery pack 40 of Embodiment 2 has the nonaqueous electrolyte secondary battery 10, an upper holder 41 and a lower holder 42. The lower holder 42 is a plastic circular member and has a circular rib 42a extending upward on the outermost peripheral side. The rib 42a has an inner diameter equal to the outer diameter of a bottom portion of the exterior case 15 of the nonaqueous electrolyte secondary battery 10 so that the bottom portion of the exterior case 15 is fitted into the space defined by the rib 42a. A negative electrode lead 46 is weld connected to the bottom of the exterior case 15 and is appropriately connected to the out side.

The upper holder 41 is a plastic circular member and has a circular first rib 41a extending downward on the outermost peripheral side, a circular second rib 41b extending downward on the inner diameter side, and at least one through-hole 43. A positive electrode lead 45 is inserted into the through-hole 43, and an end 45a of the positive electrode lead 45 is weld connected to an outer peripheral portion of the lid 22. This positive electrode lead 45 is used to establish a connection to the outside appropriately.

The first rib 41a has an inner diameter equal to the outer diameter of the crimped portion of the exterior case 15 of the nonaqueous electrolyte secondary battery 10 so that the crimped portion of the exterior case 15 is fitted into the space defined by the first rib 41a. The second rib 41b is disposed more outside in the radial direction than the fragile portion 22a of the lid 22, and its lower end is in contact with the outer surface of the lid 22.

According to the battery pack 40 of Embodiment 2 having the configuration described above, the region of the lid 22 that is located more outside in the radial direction than the position in contact with the lower end of the second rib 41b is entirely covered with the upper holder 41 and is less likely to be deformed by external force. That is, the upper holder 41 serves as a lid deformation suppressing portion.

Upon increase in the inner pressure in the battery, the pressure is applied to the step 24b in the terminal plate 24 and further to the step 22b in the lid 22. Consequently, the step 24b in the terminal plate 24 and the step 22b in the lid 22 are swollen toward the outside of the battery. During this process, the lower end of the second rib 41b serves as a fulcrum to exert a pressing force in the downward direction.

Thus, the fragile portion 24a of the terminal plate 24 and the fragile portion 22a of the lid 22 are broken immediately after the pressure in the exterior case 15 exceeds a prescribed value in the event of an abnormality in the battery, resulting in the formation of large holes in the lid 22 and the terminal plate 24. The second rib 41b may be spaced apart from the lid 22 as long as it can be placed into contact with the lid before the breakage of the fragile portion 22a.

While Embodiments 1 and 2 have illustrated the cylindrical sealed batteries as being applied to nonaqueous electrolyte secondary batteries, the scope of the invention is not limited thereto. The invention may be also applied to alkaline storage batteries such as nickel-hydrogen storage batteries and nickel-cadmium storage batteries.

When, in particular, the invention is applied to nonaqueous electrolyte secondary batteries, the materials of the battery constituents may be any known materials as described below. Specific examples will be described below.

The positive electrode plate used in the invention may be fabricated by forming a positive electrode active material layer onto a positive electrode core in the form of a foil (a thin plate). The material of the positive electrode core may be, among others, any of aluminum, aluminum alloys, stainless steel, titanium and titanium alloys. In particular, aluminum or an aluminum alloy is preferable for reasons such as that the material is resistant to electrochemical dissolution.

The positive electrode active material may be a lithium transition metal composite oxide, for example, a composite oxide including lithium and at least one metal selected from cobalt, manganese, nickel, chromium, iron and vanadium. In particular, the use of a lithium transition metal composite oxide represented by the general formula $Li_xNi_yMi_{1-y}O_2$ ($0.95 \leq x \leq 1.10$, and M is at least one of Co, Mn, Cr, Fe, Mg, Ti and Al) is preferable because the obtainable nonaqueous electrolyte secondary batteries attain a high capacity and excellent safety.

The negative electrode plate used in the invention may be fabricated by forming a negative electrode active material layer onto a negative electrode core. The material of the negative electrode core may be, among others, any of copper, copper alloys, nickel, nickel alloys, stainless steel, aluminum and aluminum alloys. In particular, copper, a copper alloy, nickel or a nickel alloy is preferable for reasons such as that the material is resistant to electrochemical dissolution.

The negative electrode active material may be any material capable of reversible storage and release of lithium ions, with examples including carbon materials such as natural graphites, spherical or fibrous artificial graphites, non-graphitizable carbons (hard carbons) and graphitizable carbons (soft carbons), metal oxide materials such as tin oxide and silicon oxide, silicon, and silicon-containing compounds such as silicides.

The separator may be a microporous film including a polyolefin material. A combination of a polyolefin material and a heat resistant material is preferably used. Examples of the polyolefins include polyethylene, polypropylene and ethylene-propylene copolymer. These resins may be used singly, or two or more may be used in combination. Examples of the heat resistant materials include heat resistant resins such as aramid, polyimide and polyamidimide, and mixtures of heat resistant resins and inorganic fillers.

The nonaqueous electrolyte is prepared by dissolving a lithium salt into a nonaqueous solvent. Examples of the nonaqueous solvents include cyclic carbonates such as ethylene carbonate, propylene carbonate and butylene carbonate, and chain carbonates such as dimethyl carbonate, diethyl carbonate and ethyl methyl carbonate. A single type, or several types of such solvents may be used.

The supporting salt that is added to the nonaqueous electrolyte may be a lithium salt having high electron-withdrawing properties, with examples including $LiPF_6$, $LiBF_4$ and $LiClO_4$. A single type, or several types of such salts may be used. Known additives such as vinylene carbonate may be added to the nonaqueous electrolyte.

The material of the lid used in the invention is preferably aluminum or an aluminum alloy. The material of the exterior case is preferably stainless steel or a nickel-plated steel sheet.

INDUSTRIAL APPLICABILITY

As described hereinabove, the cylindrical sealed batteries of the present invention allow a gas to be discharged therefrom effectively in the event of an abnormality in the battery while preventing the leakage of the gas or the electrolytic solution through the sidewall of the exterior case. Thus, the cylindrical sealed batteries achieve a great significance in industry.

REFERENCE SIGNS LIST

10: NONAQUEOUS ELECTROLYTE SECONDARY BATTERY 11: POSITIVE ELECTRODE PLATE 12: NEGATIVE ELECTRODE PLATE 13: SEPARATOR 14: CYLINDRICAL WOUND ELECTRODE ASSEMBLY 15: EXTERIOR CASE 15a: GROOVED PORTION 16: UPPER INSULATING PLATE 17: LOWER INSULATING PLATE 18: POSITIVE ELECTRODE CURRENT COLLECTOR 19: NEGATIVE ELECTRODE CURRENT COLLECTOR 20: SEALING MEMBER 21: INSULATING GASKET 22: LID 22a: FRAGILE PORTION 22b: STEP 23: INSULATING RING 23a: OPENING 24: TERMINAL PLATE 24a: FRAGILE PORTION 24b: STEP 25: WELD SPOT 26: CENTER PIN 30: NONAQUEOUS ELECTROLYTE SECONDARY BATTERY 31: TERMINAL PLATE 31a: BREAKABLE GROOVE 31b, 31d: OPENING 31c: TERMINAL PLATE PORTION 32: EXPLOSION-PROOF VALVE 32a: BREAKABLE GROOVE 33: SEALING MEMBER 34: CAP 34a: GAS RELEASE HOLE 35: INSULATING PLATE 36: WELD SPOT 40: BATTERY PACK 41: UPPER HOLDER 41a: FIRST RIB 41b: SECOND RIB 42: LOWER HOLDER 42a: RIB 43: THROUGH-HOLE 45: POSITIVE ELECTRODE LEAD 46: NEGATIVE ELECTRODE LEAD

The invention claimed is:

1. A cylindrical sealed battery comprising:
a bottomed cylindrical exterior case, a sealing member, a cylindrical wound electrode assembly including a positive electrode plate and a negative electrode plate wound together via a separator, and an electrolyte,
the cylindrical wound electrode assembly and the electrolyte being accommodated in the exterior case, an open end of the exterior case being crimped together with the sealing member via an insulating gasket so as to form a seal,
the sealing member including a lid having a thin and fragile portion, an insulating ring disposed on an inner side of the lid, and a terminal plate having a thin and fragile portion disposed on the inner side of the lid,
the terminal plate being electrically connected to a current collector leading out from the cylindrical wound electrode assembly,
the insulating ring being interposed between the lid and the terminal plate,
the lid and the terminal plate being electrically connected to each other within an opening of the insulating ring,
the lid including an aluminum plate or an aluminum alloy plate,
the lid having an inclined portion formed to protrude toward the terminal plate, and an outer peripheral portion held between surfaces of the gasket, the outer peripheral portion being thicker than the inclined portion,
a boundary between the inclined portion and the outer peripheral portion is free of a groove formed therein, and
the lid being disposed so as to expose an outer side of at least an entire portion of the lid opposed to the opening of the insulating ring directly to an outside environment.

2. The cylindrical sealed battery according to claim 1, wherein the fragile portions of the lid and the terminal plate are disposed at a position opposed to the opening of the insulating ring.

3. The cylindrical sealed battery according to claim 1, wherein the lid and the terminal plate protrude so as to be close to each other at a position opposed to the opening of the insulating ring, and are electrically connected directly to each other within the insulating ring.

4. The cylindrical sealed battery according to claim 1, wherein the exterior case includes stainless steel or a nickel-plated steel sheet.

5. The cylindrical sealed battery according to claim 1, wherein the positive electrode plate includes a positive electrode active material including a lithium nickel composite oxide represented by the general formula $Li_xNi_yMi_{1-y}O_2$ ($0.95 \leq x \leq 1.10$, M is at least one of Co, Mn, Cr, Fe, Mg, Ti and Al, and $0.6 \leq y \leq 0.95$), and
the volume energy density is not less than 500 Wh/L.

6. A battery pack comprising:
the cylindrical sealed battery described in claim 1, and a holder holding the cylindrical sealed battery,
the holder having a lid deformation suppressing portion protruding toward an outer peripheral portion of the lid.

7. The cylindrical sealed battery according to claim 1, wherein the lid consists of the aluminum plate or the aluminum alloy plate.

8. The cylindrical sealed battery according to claim 1, further comprising a center pin configured to provide a gas flow channel in a center of the cylindrical wound electrode assembly when the cylindrical wound electrode assembly has been swollen by gas generated inside the battery.

9. The cylindrical sealed battery according to claim 1, wherein a portion of the lid forms a step disposed radially inward from the inclined portion to protrude toward the opening in the insulating ring,
wherein a boundary between the inclined portion and the step is free of a groove formed therein.

* * * * *